March 19, 1935.   J. GEHBAUER   1,994,699
BRAKE AND ACCELERATOR CONTROL
Filed March 1, 1934
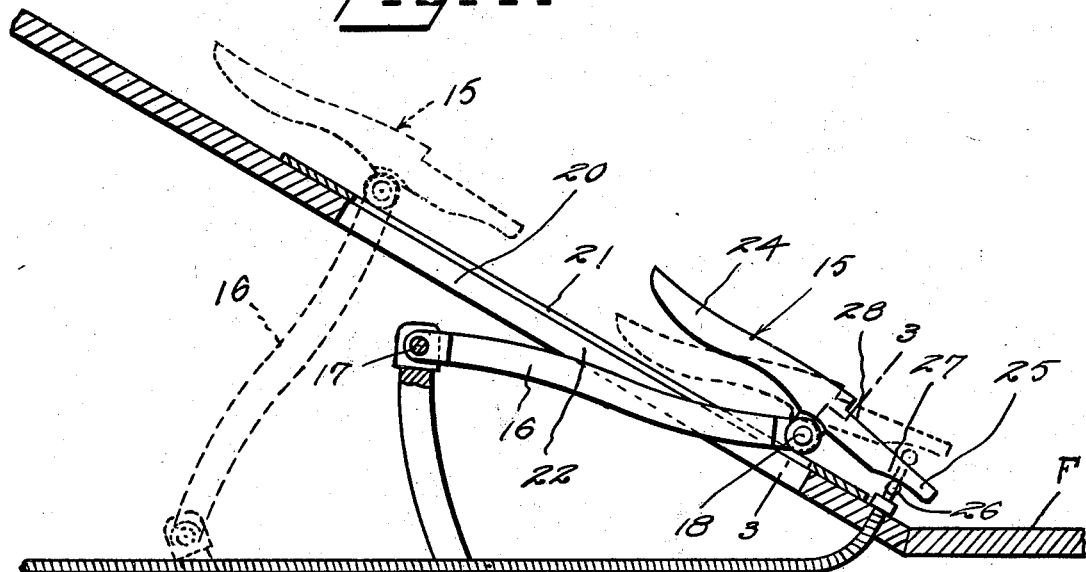
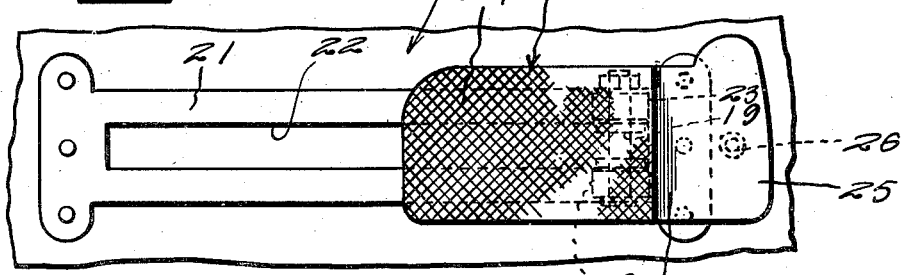
Inventor
J. Gehbauer
By Watson E. Coleman
Attorney Patented Mar. 19, 1935

1,994,699

UNITED STATES PATENT OFFICE 1,994,699

BRAKE AND ACCELERATOR CONTROL

John Gehbauer, St. Louis, Mo.

Application March 1, 1934, Serial No. 713,566

6 Claims. (Cl. 192—3)

This invention relates to motor vehicles and more particularly to an improved brake and accelerator control for a motor vehicle.

An object of this invention is to provide a unitary control for the foot brake of a motor vehicle and the accelerator so that it will not be necessary for the operator of a vehicle to lift a foot off of the accelerator which is normally disposed at one side of the brake pedal and shift the foot to the brake pedal.

Another object of this invention is to provide an improved brake operating means so that the foot of the operator can be held in a more restful and convenient position during the operation of the brakes.

A further object of this invention is to provide a means whereby the brake operating pedal will not unduly project through the floorboards of the vehicle as is the case in conventional brake pedals, thereby providing additional unobstructed space in the forward compartment of a motor vehicle.

A still further object of this invention is to provide in a device of this kind means whereby when the vehicle is at a standstill, the accelerator operating member will normally and automatically be held out of engagement with the accelerator.

The above and various other objects and advantages of this invention will in part be described and in part be understood from the following detailed description of the present preferred embodiment, the same being illustrated in the accompanying drawing wherein:—

Figure 1 is a detail side elevation partly in section of a device constructed according to the preferred embodiment of this invention, showing the device mounted on the vehicle, the body of which is shown fragmentarily in section.

Figure 2 is a top plan of the device.

Figure 3 is a sectional view taken on the line 3—3 of Figure 1.

Referring to the drawing wherein like characters of reference designate corresponding parts throughout the several views, the letter F designates generally the floor-board of a motor vehicle which is inclined upwardly in the usual manner. A brake pedal supporting shaft 10 is secured in the frame of the vehicle and as is usual, extends transversely of the frame. A brake lever 11 is secured to the shaft 10 in any desired manner, or if desired, may be rockably mounted on the shaft 10, depending only upon the type of braking system which is used in the operation of the vehicle. A bracket 12 having a bearing 13 is secured to the lower end of the brake lever 11, and the bearing 13 is offset from the lower end of the lever 11 and receives an end of a brake operating rod 14.

A pedal 15 is disposed on the upper side of the floor F and is connected to the upper end of the lever 11 through the medium of a connecting bar or link 16, which link 16 is secured as by a pivot 17 to the upper end of the lever 11 and by a shaft or pin 18 to a pair of spaced ears 19 carried by the underside of the pedal 15. The floor F has an elongated slot 20 therein through which the link 16 projects, and a plate 21 having an elongated slot 22 therein is mounted on the upper side of the floor F, the lever link 16 projecting through the slot or opening 22 in the plate or track 21.

The shaft 18 has mounted thereon on opposite sides of the ears 19 wheels or rollers 23, which are adapted to engage the track member 21 on opposite sides of the slots 20 and 22. Ears 19 hold the pedal 15 in upwardly offset relation to the track member 21 so that the pedal 15 may be rocked forwardly or rearwardly and downwardly. Preferably, the sole portion 24 or front portion of the pedal 15 is heavier than the heel or rear portion 25 so that when the brake is in inoperative position and the foot is taken off of the pedal 15, the sole portion 24 of the pedal will automatically swing downwardly and the heel portion 25 will be raised. An accelerator rod or member 26 extends through the floor F and is positioned for engagement with a cut lower side 27 in the heel portion 25. When the pedal 15 is in inoperative position with the front or sole portion 24 thereof rocked downwardly, the heel portion 25 will be disposed out of engagement with the end 26 of the accelerator rod. In this manner, the pedal 15 will not hold the accelerator rod partly depressed when the pedal is in inoperative position. Preferably, the pedal 15 has the heel portion 25 thereof offset, as at 28, so that the heel of the user of this device will be held on the pedal 15 against longitudinal or forward movement.

In the use and operation of this device, when it is desired to operate the vehicle in the usual manner by accelerating the engine, the heel of the operator is rocked downwardly so as to depress the heel portion 25 and push the accelerator 26 into open position. However, if it is desired to stop the vehicle by the use of the braking means, the pedal 15 is pushed forwardly and upwardly on the floor F with the rollers 23 engaging the track member 21. This movement of the pedal 15 will rock the lever 11 downwardly and pull the brake rod 14 forwardly so as to compress the brake bands or otherwise operate the braking system.

It will be apparent from the foregoing that an exceedingly simple brake and accelerator control has been provided whereby in the operation of the vehicle, it will not be necessary for the operator to lift the foot off of the accelerator normally disposed at one side of the brake pedal and shift the foot onto the brake pedal in order to stop the vehicle. This brake and accelerator controlling means can be incorporated in present vehicle constructions with only slight changes and with the use of this device, the operator of the vehicle will be enabled to more smoothly operate the vehicle in traffic than is possible with the brake and accelerator control now in use.

What is claimed is:—

1. A device as set forth, comprising in combination with a braking system and accelerator of a vehicle engine, a rock lever, means for connecting the rock lever to the braking system, a pedal adapted in one position to engage said accelerator, a connecting link connecting the pedal with the lever, means for pivotally connecting the link to the lever, means for pivotally connecting the link to the pedal, a track member adapted to be mounted on the inclined floor of the vehicle, and rollers carried by said pedal pivoting means to mount the pedal for movement above the floor in a plane parallel thereto.

2. A device as set forth, comprising in combination with a braking system and accelerator of a vehicle engine, a rock lever, means for connecting the rock lever to the braking system, a pedal adapted in one position to engage said accelerator, a connecting link, means for pivotally mounting the pedal on one end of the connecting link, means for rockably securing the other end of the connecting link to an end of the lever, a slotted elongated plate adapted to engage on the upper surface of the floor of the vehicle body, said link projecting through the slot in the plate, and rollers carried by the pedal engaging the plate on opposite sides of the slot to mount the pedal for movement in a plane parallel to the surface of the floor.

3. A device as set forth, comprising in combination with a braking system and accelerator of a vehicle engine, a rock lever, an arm carried by one end of the rock lever engaging the braking system, a foot pedal adapted to be disposed on the upper side of the inclined floor of the vehicle body and to engage said accelerator, a link, means for pivotally securing one end of the link to the other end of the lever, means for pivotally securing the other end of the link to the pedal, the floor of the vehicle having a slot through which the link extends, a track member disposed on the upper surface of the vehicle floor engaging on opposite sides of the slot, and rollers disposed beneath the pedal engaging the track on opposite sides of the slot to mount the pedal for movement in a plane parallel to the surface of the floor.

4. A device as set forth, comprising in combination with a braking system, and accelerator of a vehicle engine, a rock lever, means for connecting the rock lever to the braking system, a rock pedal, means for connecting the pedal to the lever, a track disposed below the pedal and engaging the upper surface of the floor of the vehicle, rollers disposed beneath the pedal and engaging the track to mount the pedal for movement longitudinally of the track, and means for mounting the accelerator rod at a point below one end of the pedal whereby to move said rod into open position upon rocking of the pedal in one direction.

5. A device as set forth, comprising in combination with a braking system and accelerator of a vehicle engine, a rock lever, a pedal, means for connecting the pedal to the rock lever, means for connecting the lever to the braking system, a track member disposed beneath the pedal, means for mounting the pedal on the track for movement thereover, said pedal comprising an elongated member, spaced ears carried by the member at a point spaced forwardly from the rear end thereof, said elongated member having a recessed portion adjacent the rear thereof, and an accelerator rod having an end disposed beneath the recessed portion of the pedal, said pedal being normally overbalanced forwardly whereby to raise the rear end upwardly out of engagement with the accelerator.

6. A device as set forth, comprising a rock lever adapted to be connected to a braking system of a vehicle, a slotted guide plate, an operating pedal slidably engaging said guide plate, and a link extending through the slot of said plate and connecting said pedal with said lever, said lever when in brake releasing position holding said pedal in a position for engagement with the accelerator of the vehicle.

JOHN GEHBAUER.